(12) United States Patent
McCormick

(10) Patent No.: US 6,802,604 B2
(45) Date of Patent: *Oct. 12, 2004

(54) INTEGRAL RESILIENT POCKET CLIP AND EYEGLASS FRAME

(76) Inventor: William McCormick, 28 Manor Rd., Huntington, NY (US) 11743

( * ) Notice: Subject to any disclaimer, the term of this patent is extended or adjusted under 35 U.S.C. 154(b) by 38 days.

This patent is subject to a terminal disclaimer.

(21) Appl. No.: 10/054,748

(22) Filed: Jan. 19, 2002

(65) Prior Publication Data

US 2002/0149738 A1 Oct. 17, 2002

Related U.S. Application Data

(63) Continuation of application No. 09/669,293, filed on Sep. 25, 2000, now Pat. No. 6,343,859, which is a continuation-in-part of application No. 09/366,460, filed on Aug. 3, 1999, now abandoned, which is a continuation-in-part of application No. 09/073,801, filed on May 6, 1998, now Pat. No. 6,017,120.

(51) Int. Cl.[7] .............................................. G02C 5/14
(52) U.S. Cl. ........................................ 351/112; 351/111
(58) Field of Search ............................... 351/112, 111, 351/41; 24/3.3

(56) References Cited

U.S. PATENT DOCUMENTS 1,779,015 A * 10/1930 Schmitt ........................ 351/112
4,983,029 A * 1/1991 Sato ............................ 351/41
6,343,859 B1 * 2/2002 Mccormick ................. 351/112

* cited by examiner

Primary Examiner—Hung Xuan Dang
(74) Attorney, Agent, or Firm—Alfred M. Walker

(57) ABSTRACT

A clip is integrally formed with or attached to each temple piece of a pair of eyeglass, to hold the eyeglasses to a garment, such as a pocket of a shirt or a belt. The pocket clip member resists torsional bending stresses caused by the constant on and off insertion or removal of the eyeglasses and clip to and from shirt pockets or other attachments. The cantilevered clip is twisted and stressed when the clip holds the eyeglass frame to the shirt pocket in a strong bond. However, the clip is adapted to undergo controlled elastic deformation from an unstressed configuration in response to torsional bending and twisting stress when the clip is inserted or removed from the pocket. The clip is further adapted to resiliently return to the unstressed configuration upon removal of the torsional bending and twisting stress, when fully inserted or removed from the pocket. The clip may be molded of thermoplastic resins such as polycarbonate or polyvinylchloride in a variety of colors to match eyeglass temple pieces such as black or brown. In addition, these clips can also be finished in a metallic tone such as gold or silver through a well known process used in packaging for cosmetics. These latter clips would closely match the temple pieces of gold or silver frames.

32 Claims, 3 Drawing Sheets

INTEGRAL RESILIENT POCKET CLIP AND EYEGLASS FRAME

RELATED APPLICATIONS

This application is a continuation of application Ser. No. 09/669,293 filed Sep. 25, 2000, now U.S. Pat. No. 6,343,859 dated Feb. 5, 2002 which application is a continuation-in-part of application Ser. No. 09/366,460 filed Aug. 3, 1999, now abandoned, which application is continuation-in-part of application Ser. No. 09/073,801, filed May 6, 1998, now U.S. Pat. No. 6,017,120 dated Jan. 25, 2000.

FIELD OF THE INVENTION

The present invention relates to eyeglass clip accessories for attaching eyeglass frames to garments, such as shirt pockets or belts and methods of assembling same.

BACKGROUND OF THE INVENTION

While some people wear glasses constantly, others wear them only intermittently or change from clear to tinted glasses depending on the ambient light conditions. It is desirable to have a clip attached to a temple bar of the glasses to engage the edge of a garment, such as a shirt pocket or belt, thereby preventing the folded glasses from falling out when bending over. Many attempts at the ideal design and method of this clip have been made over the years. Some involve modification of the temple bar or permanent attachment of the clip to the temple bar at the time of manufacture. Other attachable clips are cumbersome to mount, alter the appearance of the glasses substantially, involve expensive manufacture, provide non rigid attachment, or are conformable to a limited range of temple piece cross sections.

Among the prior art patents include U.S. Pat. No. 1,779,015 of Schmitt, which teaches temple clips that are either molded as one piece with the temple bar or attached by riveting or by a clamp form fit to the temple bar cross section. U.S. Pat. No. 1,898,059 of McDonald discloses a temple clip attached with a split barrel clamp and retained with a set screw. With respect to removable retrofit clips for eyeglass temple bars, U.S. Pat. No. 4,903,375 of DiFranco describes an inexpensive plastic clip which simply attaches to a variety of temple pieces through the use of two rubber "o" rings. This retrofit system of DiFranco '375 is not a rigid attachment however. Furthermore, U.S. Pat. No. 5,235,727 of McCloskey teaches several embodiments of an attachable pocket clip made of an elastically deformable material, such as a U-shaped spring steel clasp. Like DiFranco '375, McCloskey '727 does not teach a rigid attachment, and its U-shaped embodiment does not provide a secure fit. Different designs are used for different temple piece cross sections.

For example, McDonald '059 teaches attaching a retrofit clip to an eyeglass temple bar piece by an artificial, extra attachment member, such as a sleeve attached to the clip which slides over the temple bar piece. In addition, in Schmitt '015 the clip is attached either by rivets, or by an internal wire extending all the way through the temple bar piece and clip.

Whenever there is an external piece such as the sleeve of McDonald '059 or the rivet of Schmitt '015, there is usually a protruding element which could scratch the wearer's skin or eyes. In addition, the longitudinally extending wire piece of Schmitt is difficult to manufacture, as the wire has to be imbedded within the temple bar piece.

Two old foreign patents, namely Swiss patent no. 421,551 dated Sep. 30, 1966 of Albanesi and French patent no. 1,162,365 dated Nov. 2, 1958 of Boissot describe a clip molded with an eyeglass temple bar of an eyeglass frame. However, these two patents do not mention using particular types of thermoplastic resins or bendable metal alloys to insure that the clips resist torsional (bending) stresses because of the constant on and off moving of the eyeglasses and clip to and from shirt pockets.

Among recent patents describing the use of thermoplastic resins for resisting torsional bending of non-analogous objects subject to constant stress include U.S. Pat. No. 6,058,674 Clover for wheelchair parts, U.S. Pat. No. 5,359,911 Kruesi in the industrial sector for a lightweight self insulating composite tool; in automotive use, U.S. Pat. No. 6,085,954 of Bloemer for a pivoting extensible rear hitch attachment for equipment carrier; and U.S. Pat. No. 5,195,779 of Aoyama for a motor vehicle body structure.

Moreover, U.S. Pat. Nos. 4,316,654 and 4,496,224, both of Allen, teach eyeglass frames with pocket clips where the frames themselves are manufactured with pocket clips attached to the rims of eyeglass lenses. U.S. Pat. No. 5,414,906 of Kren discloses an eyeglass storage clip attached to a temple piece with a dual barrel design. It consists of several parts and uses spring clips to attach to a garment or pocket.

The disadvantages of the prior art are either that the temple bar pocket clips are difficult to assemble or assemble when the eye glasses are manufactured, as in Schmitt '075, McDonald '059, Allen '654, Allen '224 or Kren '906, or that the retrofit configurations of DiFranco '375 or McCloskey '727 are flimsy and not designed for long term rigid attachments.

OBJECTS OF THE INVENTION

Therefore, the objects of the present invention are as follows:

It is an object of the present invention to provide eyeglass frame clips that use particular types of thermoplastic resins or bendable metal alloys to insure that the clips resist torsional bending stresses produced by the constant insertion and removal of the eyeglasses and clip to and from pockets and other locations of attachment.

It is an object of the present invention to provide an integral pocket clip that is conformable to a wide variety of eyeglass temple pieces.

It is a further object of the present invention to provide a liquid adhesive attachment method for retrofit attachment of a pocket clip to a temple bar of a pair of eyeglasses.

It is yet another object of the present invention to provide an attachment pocket clip which blends in with the eyeglasses and adds minimal bulk.

It is yet another object of the present invention to provide a dry adhesive attachment method for retrofit attachment of a pocket clip for a temple bar of a pair of eyeglasses.

It is also another object of the present invention to provide an inexpensive pocket clip attachment set for retrofitting a temple bar of a pair of eyeglasses with a pocket clip that is easy for the user to attach.

It is yet another object of the present invention to provide a pocket clip specially designed for very narrow metal temple pieces.

It is yet a further object of the present invention to improve over the disadvantages of the prior art.

SUMMARY OF THE INVENTION

In keeping with these objects and others which may become apparent, the present invention relates to pocket clips which are of the general shape of molded plastic pocket clips commonly used on inexpensive pens. The clip is intended to be molded of thermoplastic resins such as polycarbonate or polyvinylchloride in a variety of colors to match eyeglass temple pieces. In addition, these clips can also be finished in a metallic tone.

The present invention solves the problem of the constant removal and replacement of glasses in and out of pockets producing repetitive stress on an eyeglass frame pocket clip. The stress is placed on the clip at the point of attachment to the pocket, and is especially great when the pocket is made of heavy cloth such as wool and flannel.

The stress is also great at the apex of the clip where it is joined with the temple bar. The tension or torsional force that is created by the opposition of the clip to the temple bar, is the force which holds the eyeglasses firmly in place in the pocket. The torsional force increases with the weight and size of the eyeglasses. The clip which is the source of the torsional pressure must be able to withstand the tension that it creates.

The pocket clip member resists torsional bending stresses caused by the constant on and off insertion or removal of the eyeglasses and clip to and from shirt pockets or other attachments. The cantilevered clip is twisted and stressed when the clip holds the eyeglass frame to the shirt pocket in a strong bond.

However, the clip is adapted to undergo controlled elastic deformation from an unstressed configuration in response to torsional bending and twisting stress when the clip is inserted or removed from the pocket. The clip is further adapted to resiliently return to the unstressed configuration upon removal of the torsional bending and twisting stress, when fully inserted or removed from the pocket.

Prior art has illustrated designs for eyeglass pocket clips. However until the advent of modern space age materials and manufacturing techniques, the earlier ideas could not be practically implemented.

One of these materials, thermoplastic resins, has been used with increasing frequency to overcome stress problems in many different applications.

For example, as noted before, thermoplastic resins have been used in the medical field for wheelchairs, as in U.S. Pat. No. 6,058,674 Clover; in the industrial sector, for a lightweight self insulating composite tool, as in U.S. Pat. No. 5,359,911 of Kruesi; in automotive use, for a pivoting extensible rear hitch attachment for equipment carrier, as in U.S. Pat. No. 6,085,954 of Bloemer; and for a motor vehicle body structure, as in U.S. Pat. No. 5,195,779 of Aoyama.

Another space age development in the area of metallurgy, has been the method devised to create new alloys such as nickel-titanium. These alloys enable manufacturers to produce elastic-type metallic products such as an alloy called liquid-metal. Liquid metal is produced by a patented zero-gravity, fusion process.

The application of modern materials and advanced methodologies have overcome countless limitations seemingly imposed upon earlier inventors by the laws of physics and chemistry Until the present invention there has been no pocket clip that was shown to be able to overcome the torsional stress required to repeatedly secure an adult size pair of eyeglasses in a pocket, particularly where the pocket is made of thick cloth. The present invention makes this possible by using space-age metals and plastics that withstand 360 degree bending and knot-like rotating and twisting.

Since eyeglass pocket clips are not in common use, it is obvious that effective pocket clips would be made using uncommon methods. This involves not only the materials described above, but the applications of sophisticated metallurgical and thermoplastic manufacturing techniques. With such materials there is obtained a high moment of inertia relative to the section weight to provide strong bending and torsional stiffness.

Moreover, since some of these products are themselves revolutionary, earlier inventors could not have foreseen the utility of these applications. Hence, it is not reasonable to suggest that such solutions were obvious to those skilled in the art.

Clover '674 cited the need for a structural member that was inexpensive to make, preferably by injection molding, to control the torsional bending required in the application. This solved the problem of meeting the needs of different users.

By analogy, applicant's invention overcomes the problem of random amounts of torsional stress produced by varying thickness of materials which the clip would engage.

In order to overcome the problem of gaining access to the rear of a vehicle when it is equipped with a loaded bicycle rack, in a pivoting extensible rear hitch attachment for an equipment carrier, Bloemer '954 utilized structural steel 'C' channels to provide torsional and bending stiffness to support the equipment.

By analogy to Bloemer '954, applicant's invention achieves similar torsional bending results with the use of super-elastic alloys and plastics.

In a motor vehicle body structure employing a sandwiched structural body, in order to provide for a motor vehicle body with greater rigidity to torsional and bending stresses Aoyama '779 describes an auto body component which is made of fiber reinforced plastic, the matrix of which is thermoplastic resin. Again, by comparison to applicant's clip, a torsional stress problem was solved with modern materials.

The purpose of Kruesi '901 was to create a lightweight screwdriver that could withstand high electrical charges. To achieve the purpose, the tool shank is made of composite materials including epoxies and resins such as Union Carbide ERL-4221 Cycloaliphatic, Dow Derakane-8084, Advanced Polymer Science's Siloxirane, and high thermoplastics such as PET Polyester, Polysulfone, nylon, RTM, etc.

Notably, these materials as well as the injection molded thermoplastic handle provide the requisite bending stiffness without making the tool excessively bulky. Once again modern methods and materials have provided the solution.

Despite the enormous market for a workable pocket clip for every pair of eyeglasses and sunglasses, no development or manufacture has occurred.

The Boissot Patent 1958, and Albanesi 1966, are 52 and 43 years old, respectively. Although each patent includes drawings as "FIG. 6", which show some similarity in appearance, the fact is none of those pocket clips has ever been widely implemented.

Given the advantages of applicant's invention, surely, if obvious, those skilled in the art would have developed and marketed the idea. Undoubtedly, in the intervening decades since Boissot and Albanesi hundreds of millions of glasses of all types, have been designed, made and sold. Despite the obvious skill of the various worldwide designers and makers of glasses, and the immense increase in the use of glasses and sunglasses, there is no effective pocket clip for them. This is overwhelming proof by itself, that applicant's invention is not obvious.

The torsional bending problem which is inherent with a pocket clip for glasses was never considered by Boissot or Albanesi. By utilizing modern materials and methods of manufacture, applicant has found the solution to this inherent problem. Accordingly, the references to Boissot and Albanesi, are weak at best, and should not be relied upon to reject applicant's claims.

Even if attempts had been made to implement the Boissot and Albanesi ideas, the results would be have been unsuccessful.

In the preferred embodiment for plastic eyeglass frames, the clip is manufactured and molded integral with the temple bar piece as a one piece unit, to engage the edge of an article of clothing. The pocket clip includes a base having a cantilevered clothing engaging portion extending therefrom.

In a further embodiment, the clip is die cast integral with metal temple bars of metal eyeglass frames. Alternatively, the eyeglass frame can be made of a combination of plastic and metal.

The eyeglass frame temple bar pieces with integral clips thereon can be made from a weldable or solderable, metallic material that is sufficiently resilient and flexible to withstand torsional forces that are applied to the eyeglass frame, such as described in U.S. Pat. No. 5,801,806 of DiChiara.

According to DiChiara '806, the temple bar pieces with integral clips thereon can be made from a nickel silver, stainless steel, titanium, or from a Monel alloy, such as a nickel silver known as M215 available from Salero Maddalena & Csrl, Solbiate Arno, Italy.

The eyeglass frames can be from non-metallic materials, such as plastic, which is sufficiently resilient and durable.

The resilient and durable plastics can include thermoplastics, polypropylene, polyethylene or thermosetting polymers, such as those with silicone or metals therein.

The one piece temple bar piece with an integral clip can also be made by such processes for making eyeglass frames as described in U.S. Pat. No. 5,708,489 of Jannard. Jannard '489 discloses a variety of materials can be utilized to produce a eyewear pieces.

A variety of metals and alloys, such as chrome molybdenum, chromium, nickel molybdenum, nickel molybdenum and chrome vanadium steel alloys, can be used. Copper, aluminum and silver based alloys can also be used. Preferably, however, according to Jannard '489 lightweight, high strength materials such as titanium a titanium-based alloy or titanium based metal matrix composite such as TI6AL4V, available from Timet Corp., are utilized in constructing the eyeglass frames.

In general, any investment castable metal or metal containing material can be used in making the eyeglass frame and integral clip, such as through routine experimentation by one of ordinary skill in the art in view of the disclosure contained herein.

For example, machining techniques, casting and forging methods can be used. With respect to casting techniques, metal framed eyewear can be produced utilizing permanent mold castings, dye castings, sand castings, or investment casting techniques, utilizing a ceramic mold. The mold is formed by pouring a slurry of a material such as a known mold forming refractory material around an orbital or eyeglass pattern, which is maintained in position within a flask as is understood in the investment casting art. Following a preliminary drying, the mold is baked in an oven to melt the pattern, thereby leaving an empty mold cavity. The investment mold is thereafter fired at a temperature which is appropriate for the metal to be used, and, while still hot, molten metal is poured into the mold and allowed to solidify. The mold is thereafter broken away from the casting to produce the cast orbital or eyeglass. The cast component may thereafter be subject to post-casting operations such as sanding, polishing, grinding, or otherwise as desired to produce the finished product.

In addition to the conventional metals and metal alloys, the eyeglass frame temple bar piece and integral clip can be also made with metal matrix composites, metal-polymer blends and potentially purely polymeric plastic compositions.

The eyeglass clip of the present invention compensates for the fact that the cantilevered clip exerts a significant bending moment upon the temple bar piece to which it is attached, due to the high torsional component of a cantilevered piece being subject to twisting and bending stresses when applied to the shirt pocket over time.

In the embodiment for an attached clip, slow drying glues such as rubber cement or paper muscilage are not appropriate, since they take a long time to dry and do not have the adhesive strength of the liquid instant adhesive cyanoacrylate used in one embodiment of the present invention.

Cyanoacrylate adhesive for attaching a clip was found to be cured in a matter of less than one minute, and it created a strong bond between the plastic clip and the plastic eyeglass frame.

The clip was tested repeatedly under different types of thickness' of clothing, such as thin summer shirts or thicker fall and winter shirts, as well as even thicker jacket pockets under different weather conditions, such as hot or cold weather, as well as sunny or stormy, humid weather.

It was found that the clip stayed in place under various challenging conditions and that it did not loosen after repeated applications of the eyeglass and clip to a shirt pocket.

It was found that the fast, strong bond counteracted any adverse effects of the cantilevered clip exerting a significant bending moment upon the temple bar piece to which it was attached, from the high torsional component of the cantilevered piece being twisted and stressed when the clip held the eyeglass frame to the shirt pocket in a strong bond.

In addition, the present invention is done without a protruding member to scratch the skin or eye of the user, such as the rivets of Schmitt or the sleeve of McDonald.

This avoids the need for an external piece such as the sleeve of McDonald or the rivet of Schmitt, which could scratch the wearer's skin or eyes. In addition, the present invention does not need a longitudinally extending wire piece such as in Schmitt, which is difficult to manufacture, as the wire has to be imbedded within the temple bar piece.

The clip becomes an integral part of the eyeglass frame and will not slip, detach or loosen as the non-fixed McDonald design will. The clip of the present invention obviates the need to drill holes or otherwise modify the temple bar of the eyeglass frame.

Therefore, according to the present invention, a pair of eyeglasses includes a pocket clip which is integral with a temple bar piece, or is strongly attached to one of its temple pieces, by adhesive or the like. An alternate embodiment includes a clip including a slot for insertion of an adhesive band therethrough.

Furthermore, in another embodiment, instead of a cantilevered clip, the clip may be a gripper clip, such as a spring loaded alligator clip.

BRIEF DESCRIPTION OF THE DRAWINGS

The present invention can best be understood in conjunction with the accompanying drawings, in which.

DETAILED DESCRIPTION OF THE DRAWINGS

Figure 1:
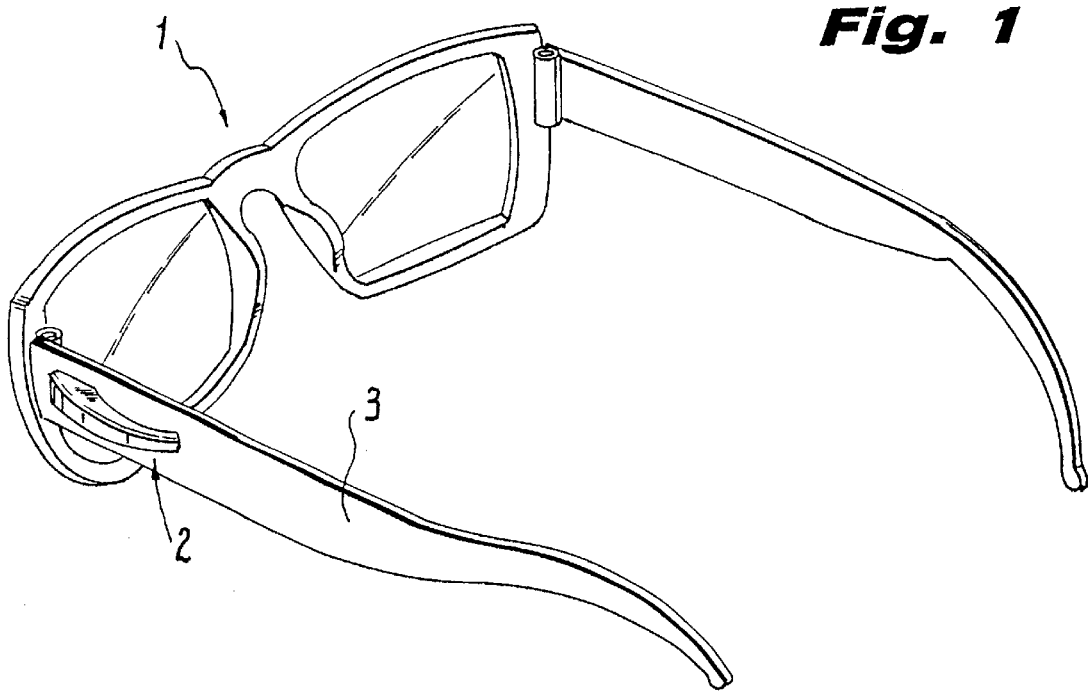
FIG. 1 is a perspective view of a pair of eyeglasses with a retrofit pocket clip attached thereto.

As shown in FIG. 1, pocket clip 2 of the present invention is of the general shape of the type of molded plastic pocket clips commonly used on inexpensive writing pens. Pocket clip 2 is intended to be molded of thermoplastic resins such as polycarbonate or polyvinylchloride in a variety of colors to match the color of eyeglass temple piece 3, such as black or brown. In addition, clip 2 can also be finished in a metallic tone such as gold or silver through a well known process used in packaging for cosmetics. Such latter clip 2 can closely match color of temple piece 3 of frame 1 of gold or silver. Structurally, pocket clip 2 includes base portion 2a having shirt pocket engaging portion 2b cantilevered from base portion 2a.

In the preferred embodiment for plastic eyeglass frames, the clip 2 is manufactured and molded integral with the temple bar piece 3 as a one piece unit.

As shown in FIG. 1, clip 2 is manufactured and molded integral with temple bar piece 3 as a one piece unit, to engage the edge of an article of clothing. Clip 2 includes a base 2a attached to temple bar piece 3 and has a cantilevered clothing engaging portion 2b extending therefrom.

As noted previously in the Summary of the Invention herein, eyeglass frame 1 with temple bar 2 having clip 2 integral thereto may be molded from plastic for plastic eyeglass frames or may be die cast integral with a metal temple bar 3 for metal eyeglass frames.

Alternatively in another embodiment, frame 1 of a pair of eyeglasses may have pocket clip 2 which has been attached to one temple piece 3 of the pair of temple pieces of frame 1.

For example pocket clip 2 may be alternatively attached to temple piece 3 using a small drop of liquid instant adhesive, such as cyanoacrylate, at mounting surface 5 thereof. Clip 2 is conformable to a wide variety of temple pieces, even quite narrow metallic ones.

This alternate attachment method involves the use of a liquid adhesive that the buyer may not have. In addition, the adhesive has limited shelf life, and the user must be familiar with its tendency to "glue fingers together".

Figure 2A:
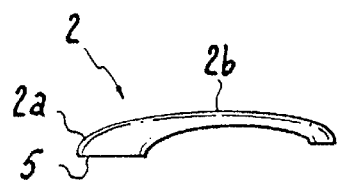
FIG. 2A is a side elevational view of a pocket clip for liquid adhesive attachment to a temple bar of a pair of eyeglasses.
Figure 2B:
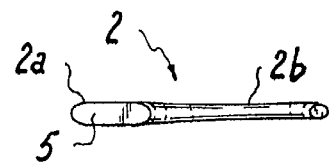
FIG. 2B is a bottom view thereof.
Figure 3A:
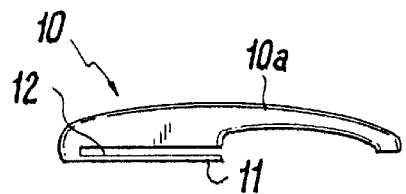
FIG. 3A is a side elevational view of a pocket clip for dry adhesive attachment, to a temple bar of a pair of eyeglasses.
Figure 3B:
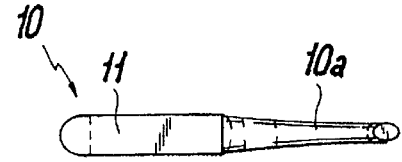
FIG. 3B is a bottom view thereof.

Another embodiment shown in FIG. 3 uses a combination of dry adhesives (i.e.—tapes) to accomplish the attachment of pocket clip 10 to temper bar 3. This also facilitates the packaging of the clip with the attachment materials as an inexpensive complete retrofit kit, since it would be more expensive to package clip 2 of FIG. 2 with liquid adhesive.

Clip 10 of FIG. 3 is also a molded clip of a similar shape to that of clip 2, but clip 10 it has larger base area 11 for mounting clip 10 upon temple bar 3. Clip 10 also includes slot 12 to accept some high bond transparent tape strip 16. Clip 10 also includes cantilevered shirt pocket engaging portion 10a By using a combination of dry adhesive types, the best features of each is used to accomplish a rigid permanent bond.

Figure 4:
FIG. 4 is a top plan view of die-cut double sided high bond tape, used with a dry adhesive attachment embodiment for a pocket clip for a temple bar of a pair of eyeglasses.
Figure 5:
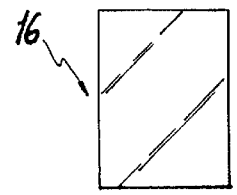
FIG. 5 is a top plan view of a transparent high bond tape member with a release liner, used with the dry adhesive attachment embodiment as in FIG. 4.

FIG. 4 shows a top view of double sided tape strip 15, which is a die cut piece of double sided high-bond tape with release liners on both top and bottom surfaces. Double sided tape strip 15 is cut to the exact size of mounting surface 11 of clip 10. As shown in FIG. 5, also included in the kit is a short piece of high bond single-sided transparent strip tape 16, having a release liner. Both types of dry adhesive tape strips 15,16 are made by 3-M Company, and single-sided transparent tape strip 16 is marketed as "3-M Super Bond" tape.

This further alternate attachment method for attaching pocket clip 10 to temple bar 3 involves the following simple steps:

1. One release liner is detached from die cut double sided tape strip 15.

2. Double sided strip 15 is attached to mounting surface 11 of clip 10.

3. The other release liner is removed from double sided tape strip 15 and pocket clip 10 is attached to temple bar 3.

4. The release liner is removed from single sided transparent tape strip 16.

5. Single sided transparent tape strip 16 is placed in slot 12 of clip 10 with the adhesive face down.

6. Single sided transparent tape strip 16 is then tightly wound around temple bar 3 and trimmed appropriately.

Figure 6:
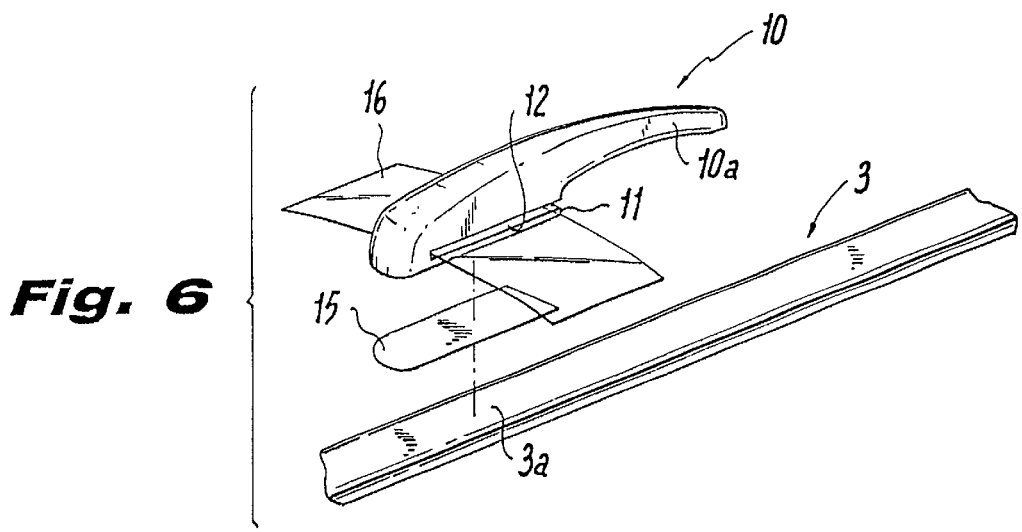
FIG. 6 is an isometric exploded view showing a dry adhesive attachment method for the pocket clip as in FIGS. 3A and 3B herein.

FIG. 6 shows an exploded view of the relative position of the various components during the process just described.

Figure 7:
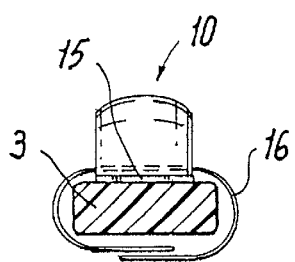
FIG. 7 is an end view of a retrofit pocket clip with the temple piece shown in cross section.

FIG. 7 shows an end view in partial cross section of pocket clip 10 attached to temple bar 3, with double sided tape strip 15 located between pocket clip 10 and temple bar 3. Single sided transparent tape strip 16 ends up wound around temple bar 3 but is shown away from temple bar 3 for clarity.

By using double sided tape strip 15, pocket clip 10 is resistant to shear forces, but the peel strength is not very high. To compensate for this disadvantage of double sided tape strip 15, transparent tape strip 16 has very good tensile strength, which prevents pocket clip 10 from being peeled off temple bar 3. However, single sided tape strip 16 does not resist shear forces or twisting very well. Therefore, the combination of both tape strips 15,16 provides a rigid permanent attachment. Furthermore, the use of slot 12 for insertion of single sided tape 16 insures a neat appearance with an unbroken top surface on pocket clip 10.

Figure 8:
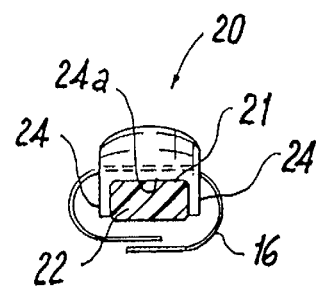
FIG. 8 is an end view, a first alternate embodiment of a retrofit pocket clip, with the temple piece in cross section of clip for narrow metal temple pieces shown mounted with a dry adhesive.
Figure 9:
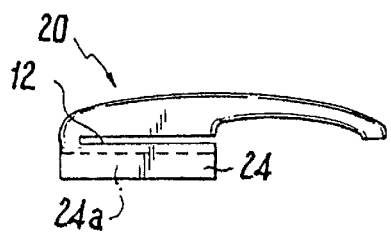
FIG. 9 is a side elevational view of a second alternate embodiment for a retrofit pocket clip for eyeglasses, with narrow metal temple pieces, wherein a user uses a dry adhesive mounting method.

While pocket clip 10 of the last embodiment shown in FIGS. 3–7, will attach well to very narrow metal temple pieces, a special further embodiment for these types which attach even more aggressively is shown in FIGS. 8 and 9.

Therefore, FIGS. 8 and 9 show two different views of such further embodiment of pocket clip 20. Pocket clip 20 is slightly narrower than pocket clip 10 and pocket clip 20 has two downwardly extending skirts 24, which skirts 24 form a groove that accepts narrow metal temple bar 22.

In this embodiment shown in FIGS. 8 and 9, the die cut double sided tape strip 21 is now much narrower and fits inside groove 24a between respective side skirts 24. Thereafter, single sided transparent tape strip 16 is placed in slot 12 as in the previous embodiment shown in FIGS. 3–7. The attachment method of FIGS. 8 and 9 is similar to that of the last embodiment shown in FIGS. 3–7, using clip pocket 10.

Figure 10:
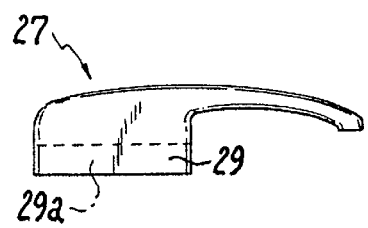
FIG. 10 is a side view of a third alternate embodiment for a retrofit pocket clip for eyeglasses with narrow metal temple pieces shown using a liquid adhesive mounting method.

Another embodiment for pocket clip 27 is shown in FIG. 10. In this embodiment, pocket clip 27 is similar in configuration to pocket clip 20 but pocket clip 27 does not have a slot similar to slot 12. This embodiment of FIG. 10 is for liquid adhesive attachment to very narrow metal temple bars.

Figure 11:
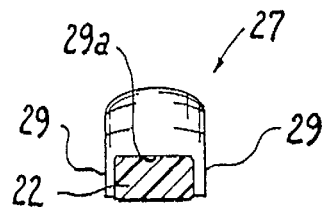
FIG. 11 is a cross sectional view of the embodiment shown in FIG. 10.

As shown in FIG. 11, it should be appreciated that a drop of instant liquid adhesive in groove 29a formed between respective skirts 29 of pocket clip 27 strongly attaches pocket clip 27 to temple bar 22, since the adhesive bonds on three sides to inside surfaces of respective skirts 29 and pocket clip 27.

Figure 12:
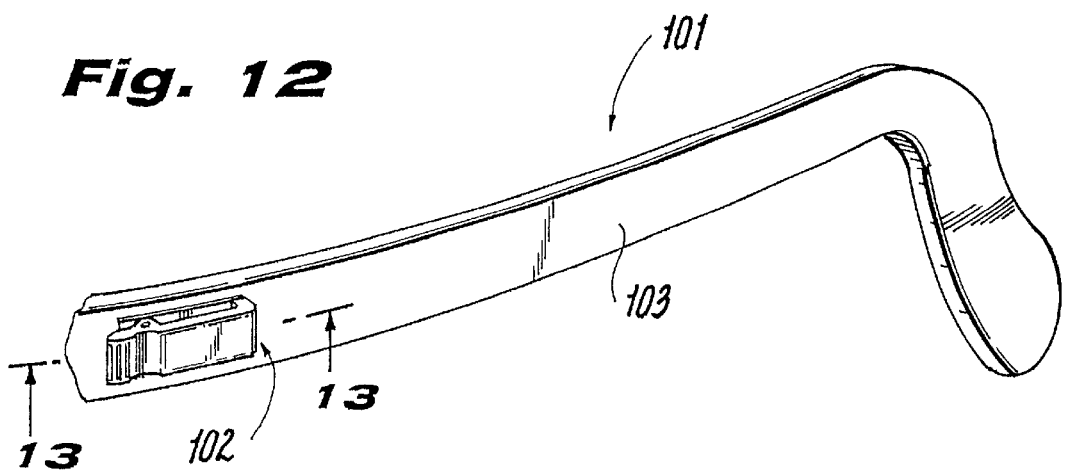
FIG. 12 shows a perspective view of another embodiment for an alligator type attachment clip according to the present invention.
Figure 13:
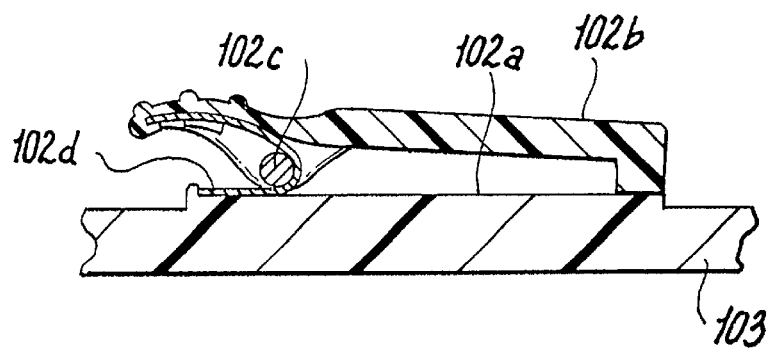
FIG. 13 shows a cross-sectional view of the attachment system according to the present invention along the line 13—13 of FIG. 12; and, FIG. 14 shows a closeup perspective detail view of the clip as in FIG. 12, shown in an open position according to the present invention.
Figure 14:
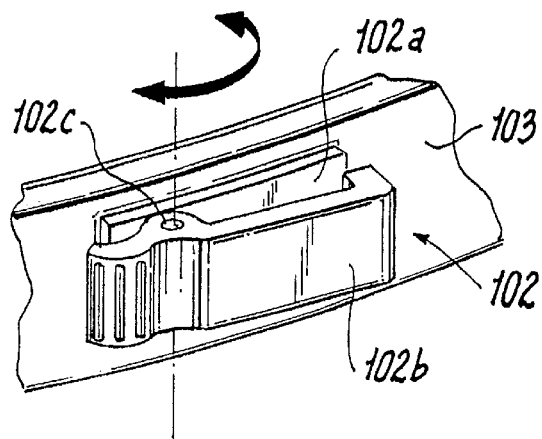

Another further embodiment according to the present invention can be illustrated by FIGS. 12–14, which depict an exemplary embodiment of the present invention. Eyeglass frame 101 includes temple bar piece 103 with alligator clip 102 attached thereto. Alligator clip 102 includes base section 102a and attachment section 102b, which is spring loaded and pivotable about fulcrum 102c by spring 102d. Alligator clip 102 engages with a garment, such as a shirt pocket or belt, so that the garment is tightly gripped by the clip, thereby holding the eyeglasses in place.

FIGS. 13–14 further detail this embodiment. Bottom base section 102a is attached to attachment section 102b, which comprises a top piece. As shown, top piece 102b and bottom piece 102a are interlocked in a enclosed position, by spring 102d, which exerts pressure upon top attachment section 102b when handle lever 102e is depressed. Clip 102 is either attached by an instant liquid adhesive, such as cyanacrylate, or is molded integral with the temple bar piece 103 as a one piece unit.

Attachment top piece 102b and bottom base piece 102a become interlocked about fulcrum 102c when they are joined together in the closed position. Interlocking can be achieved via movement of handle 102b may have a flat fabric engaging portion, or to enhance gripping, may include a texturized surface, such as with serrations, ribs, etc.

It is further noted that other modifications may be made to the present invention without departing from the scope of the present invention, as noted in the appended claims.

I claim:

1. An eyeglass frame having a lens rim, a pair of lenses, a pair of temple bars extending from said lens rim, said eyeglass frame having a clip attaching said eyeglass frame to an article of clothing, said clip comprising:

a single spineless solid pocket clip member manufactured integral with one of said temple bars of said eyeglass frame to engage the edge of the article of clothing, said pocket clip member including a base having a cantilevered clothing engaging portion extending therefrom, and said pocket clip member and integral temple bar being fabricated from at least one material selected from a group consisting of a thermoplastic resin, a bendable metal and a combination thereof capable of undergoing controlled elastic deformation from an unstressed configuration in response to torsional bending and twisting stress when said pocket clip member clip is inserted or removed from a pocket and to resiliently return to the unstressed configuration upon removal of the torsional bending and twisting stress.

2. The eyeglass frame as in claim 1, wherein said at least one material comprises polycarbonate.

3. The eyeglass frame as in claim 1, wherein said at least one material comprises polyvinylchloride.

4. The eyeglass frame as in claim 1, wherein said at least one material comprises polypropylene.

5. The eyeglass frame as in claim 1, wherein said at least one material comprises polyethylene.

6. The eyeglass frame as in claim 1, wherein said at least one material comprises a bendable metal.

7. The eyeglass frame as in claim 1, wherein said at least one material comprises a bendable metal alloy.

8. The eyeglass frame as in claim 1, wherein said integral temple bar has a solid cross section.

9. The eyeglass frame as in claim 1, wherein said clip has a solid cross section.

10. The eyeglass frame according to claim 1, wherein said integral temple bar has a substantially homogenous cross section.

11. The eyeglass frame according to claim 1, wherein said at least one clip has a substantially homogenous cross section.

12. The eyeglass frame according to claim 1 wherein said clip is molded integral to said temple bar.

13. The eyeglass frame according to claim 1 wherein said clip is cast integral to said temple bar.

14. The eyeglass frame according to claim 1 wherein said clip is welded integral to said temple bar.

15. The eyeglass frame according to claim 1 wherein said clip is soldered integral to said temple bar.

16. The eyeglass frame according to claim 1 wherein said material is a metal-polymer blend.

17. An eyeglass frame having a lens rim, a pair of lenses, a pair of temple bars extending from said lens rim, said eyeglass frame having a clip attaching said eyeglass frame to an article of clothing, said clip comprising;

a single spineless solid pocket clip member manufactured integral with one of said temple bars of said eyeglass frame to engage the edge of the article of clothing, said pocket clip member including a base having a cantilevered clothing engaging portion extending therefrom, and said pocket clip member and integral temple bar being fabricated from at least one material selected from a group consisting of a thermoplastic resin, a bendable metal and a combination thereof wherein said at least one material is capable of undergoing controlled elastic deformation from a first position to a second position in response to torsional bending and twisting stress and reformation from said second position to said first position upon removal of the torsional bending and twisting stress.

18. The eyeglass frame as in claim 17, wherein said at least one material comprises polycarbonate.

19. The eyeglass frame as in claim 17, wherein said at least one material comprises polyvinylchloride.

20. The eyeglass frame as in claim 17, wherein said at least one material comprise polypropylene.

21. The eyeglass frame as in claim 17, wherein said at least one material comprises polyethylene.

22. The eyeglass frame as in claim 17, wherein said at least one material comprises a bendable metal.

23. The eyeglass frame as in claim 17, wherein said at least one material comprises a bendable metal alloy.

24. The eyeglass frame as in claim 17, wherein said integral temple bar has a solid cross section.

25. The eyeglass frame as in claim 17, wherein said clip has a solid cross section.

26. The eyeglass frame according to claim 17, wherein said integral temple bar has a substantially homogenous cross section.

27. The eyeglass frame according to claim 17, wherein said at least one clip has a substantially homogenous cross section.

28. The eyeglass frame according to claim 17 wherein said clip is molded integral to said temple bar.

29. The eyeglass frame according to claim 17 wherein said clip is cast integral to said temple bar.

30. The eyeglass frame according to claim 17 wherein said clip is welded integral to said temple bar.

31. The eyeglass frame according to claim 17 wherein said clip is soldered integral to said temple bar.

32. The eyeglass frame according to claim 17 wherein said material is a metal-polymer blend.

\* \* \* \* \*